United States Patent
Geng et al.

(10) Patent No.: US 10,479,604 B2
(45) Date of Patent: Nov. 19, 2019

(54) SYSTEM AND METHOD FOR ITEM MANAGEMENT

(71) Applicant: BOE TECHNOLOGY GROUP CO., LTD., Beijing (CN)

(72) Inventors: Lihua Geng, Beijing (CN); Masakazu Okamura, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/762,754

(22) PCT Filed: Mar. 23, 2017

(86) PCT No.: PCT/CN2017/077853
§ 371 (c)(1),
(2) Date: Mar. 23, 2018

(87) PCT Pub. No.: WO2017/202127
PCT Pub. Date: Nov. 30, 2017

(65) Prior Publication Data
US 2018/0273294 A1    Sep. 27, 2018

(30) Foreign Application Priority Data

May 27, 2016 (CN) .......................... 2016 1 0366333

(51) Int. Cl.
*B65G 1/137*  (2006.01)
*G06K 7/14*  (2006.01)

(52) U.S. Cl.
CPC ......... *B65G 1/1373* (2013.01); *G06K 7/1413* (2013.01); *G06K 7/1417* (2013.01)

(58) Field of Classification Search
CPC combination set(s) only.
See application file for complete search history.

(56) References Cited

U.S. PATENT DOCUMENTS

| | | | |
|---|---|---|---|
| 2002/0174038 A1 | 11/2002 | Chien | |
| 2014/0350711 A1* | 11/2014 | Gopalakrishnan ... | G06Q 10/087 700/213 |
| 2015/0206121 A1* | 7/2015 | Joseph ................ | G06Q 20/208 705/23 |

FOREIGN PATENT DOCUMENTS

| CN | 101187935 A | 5/2008 |
|---|---|---|
| CN | 204270347 U | 4/2015 |

(Continued)

OTHER PUBLICATIONS

First Office Action in the Chinese Patent Application No. 201610366333.5, dated Dec. 6, 2018; English translation attached.

(Continued)

*Primary Examiner* — Kyle O Logan
(74) *Attorney, Agent, or Firm* — Intellectual Valley Law, P.C.

(57) ABSTRACT

System and method for item management are provided. The system includes storage compartments, a scanner on each storage compartment, a memory, and at least one processor. Each scanner is configured to scan an identification code on an item that is picked up from and placed down in the storage compartment. The processor is coupled to the scanner and the memory. The processor is configured to: decode an identification code on an item scanned by one scanner; generate decoding information for the identification code upon a successful decoding; determine an operation type of the item based on the scanning of the identification code on the item; obtain item location information for the identification code, based on the one scanner for the identification code; and update item management information according to the decoding information, the item location information, and the operation type of the item for the identification code.

10 Claims, 4 Drawing Sheets

(56) References Cited

FOREIGN PATENT DOCUMENTS

CN 105321011 A 2/2016
CN 105373757 A 3/2016

OTHER PUBLICATIONS

Second Office Action in the Chinese Patent Application No. 201610366333.5, dated Jun. 12, 2019; English translation attached.

\* cited by examiner

SYSTEM AND METHOD FOR ITEM MANAGEMENT

CROSS-REFERENCE TO RELATED APPLICATION

This application is a national stage application under 35 U.S.C. § 371 of International Application No. PCT/CN2017/077853, filed Mar. 23, 2017, which claims the priority of Chinese Patent Application No. 201610366333.5, filed on May 27, 2016, the entire content of which is incorporated herein by reference.

FIELD OF THE DISCLOSURE

The present disclosure generally relates to the field of item management technology and, more particularly, relates to a system for item management and a method for item management.

BACKGROUND

Currently, managements of items, such as enterprise warehouse items, supermarket goods, library books, etc. are involved in many areas. For a large number of items, it is difficult and error-prone to rely on labor management. For example, in a library, special librarians may need to record information about the numbers and locations of all books. Often, some readers leave the books on a random bookshelf after reading. So the librarians may have to regularly check the books on the storage compartments, to place each book on a correct position of a corresponding bookshelf to facilitate other readers to find it. When a large number of new books arrive at the library, the librarians may have to record or input the book name, author, storage location and other necessary information of each book. These tasks are not only labor intensive but also error-prone.

The disclosed item management system and method are directed to solve one or more problems set forth above and other problems.

BRIEF SUMMARY OF THE DISCLOSURE

In accordance with some embodiments of the present disclosure, a system for item management and a method for item management are provided.

One aspect of present disclosure provides a system for item management. The system for item management includes a plurality of storage compartments, at least one scanner on each storage compartment, a memory, and at least one processor. Each scanner is configured to scan an identification code on an item that is picked up from the storage compartment and placed down in the storage compartment. The at least one processor is coupled to the at least one scanner and the memory. The memory stores computer-executable instructions for controlling the at least one processor to: decode an identification code on an item scanned by one scanner; generate decoding information for the identification code upon a successful decoding; determine an operation type of the item based on the scanning of the identification code on the item; obtain item location information for the identification code, based on the one scanner for the identification code; and update item management information according to the decoding information, the item location information, and the operation type of the item for the identification code. The item management information further includes item quantity information, and item information.

Optionally, the operation type of the item includes a placing-down operation and a picking-up operation.

Optionally, the at least one processor is further configured to determine the operation type of the item as the placing-down operation in response to scanning the identification code in a first direction; and determine the operation type of the item as the picking-up operation in response to scanning the identification code in a second direction.

Optionally, and inner side of the identification code on the item close to an inner side of the storage compartment is scanned before an outer side of the identification code on the item close to an outer side storage compartment is scanned, as the identification code is scanned in the first direction. An outer side of the identification code on the item close to an outer side of the storage compartment is scanned before an inner side of the identification code on the item close to an inner side of the storage compartment is scanned, as the identification code is scanned in a second direction.

Optionally, the at least one processor is further configured to obtain item information from an identification code database pre-established based on decoding information and according to item location information; and update item management information based on the obtained item information, as well as decoding information, item location information, and operation type information in line with the item information.

Optionally, the system further includes at least one alarming device for each group of storage compartments. The at least one processor is further configured to generate a first alarm instruction in a case that a decoding operation fails. Each alarming device is configured for performing a first alarm reminder based on the first alarm instruction.

Optionally, the at least one processor is further configured to generate a second alarm instruction in a case that it is failed to obtain item information based on the decoding information; and each alarming device is configured to perform a second alarm reminder based on the second alarm instruction.

Optionally, the system further includes at least one wireless communicator for each group of storage compartments. Each wireless communicator is configured to transmit the decoding information, the item location information, and the operation type information determined by the decoding module to the data managing module, and to transmit the second alarm instruction generated by the information obtaining unit to a corresponding alarming device.

Optionally, the system further includes a user communication module; and an item retrieving module configured to receive a searching query through the user communication module, perform a searching operation in the data management module based on the received searching query, and output a searching result through the user communication module.

Another aspect of present disclosure provides a system for item management. The system for item management includes a plurality of storage compartments and at least one scanner no each storage compartment. Each scanner is configured to scan an identification code on an item that is picked up from the storage compartment and placed down in the storage compartment. A decoding module is configured to decode an identification code on an item scanned by one scanner, generate decoding information of the identification code upon a successful decoding, determine an operation type of the item based on the scanning of the identification code on the item, and obtain item location information for the identification code, based on the one scanner for the identification code. A data managing module is configured to update item management information according to the decoding information, the item location information, and the operation type of the item for the identification code. The item management information further includes item quantity information, and item information.

Optionally, the operation type of the item includes a placing-down operation and a picking-up operation. The decoding module is configured to: determine the operation type of the item as the placing-down operation in response to scanning the identification code in a first direction, and determine the operation type of the item as the picking-up operation in response to scanning the identification code in a second direction.

Optionally, the managing module includes: an information obtaining unit configured to obtain item information from an identification code database pre-established based on decoding information and according to item location information; and an item database configured to update item management information based on the obtained item information, as well as decoding information, item location information, and operation type information in line with the item information.

Optionally, the system further includes: a user communication module; and an item retrieving module configured to receive a searching query through the user communication module, to perform a searching operation in the data management module based on the received searching query, and to output a searching result through the user communication module.

Another aspect of present disclosure provides a method for item management, including setting at least one scanner for each of a plurality of storage compartments; scanning an identification code on an item that is picked up from one storage compartment or placed down in one storage compartment in a regulated manner by using a scanner setting on the one storage compartment; decoding the identification code scanned by the scamer by using a decoding module; when the decoding is successful, generating decoding information for the identification code, determining an operation type of the item according to the scanning of the identification code on the item, and determining item location information based on an identification of the scanner set on the storage compartment; and updating item management information according to the decoding information, the item location information, and the operation type for the identification code. The item management information further includes item quantity information, and item information.

Optionally, determining the operation type of the item based on the scanning of the identification code on the item includes: determining the operation type of the item as a placing-down operation in response to scanning the identification code in a first direction; and determining the operation type of the item as a picking-up operation in response to scanning the identification code in a second direction.

Optionally, scanning the identification code in the first direction indicates that an inner side of the identification code on the item close to an inner side of the storage compartment is scanned before an outer side of the identification code on the item close to an outer side of the storage compartment is scanned. Scanning the identification code in a second direction indicates that an outer side of the identification code on the item close to an outer side of the storage compartment can be scanned before an inner side of the identification code on the item close to an inner side of the storage compartment is scanned.

Optionally, the method further includes: establishing an identification code database based on decoding information and according to item location information; obtaining item information of the item from the identification code database based on decoding information for the identification code of the item; and updating an item database based on the obtained item information.

Optionally, updating the item database based on the obtained item information includes: when the operation type of the item is determined as a placing-down operation, and the item database does not include any record of the item, the item management information including the decoding information, the item location information, the item quantity information, and the item information of the item into the item database; when the operation type of the item is determined as a placing-down operation, and the item database has a record of the item, increasing a quantity of the item at a corresponding location in the item management information by one; and when the operation type of the item is determined as a picking-up operation, decreasing a quantity of the item at a corresponding location in the item management information by one.

Optionally, the method further includes: setting at least one alarming device for each group of storage compartments; generating a first alarm instruction when a decoding operation fails; performing, using one corresponding alarming device, a first alarm reminder based on the first alarm instruction; generating a second alarm instruction when it is failed to obtain item information based on the decoding information; and performing, using one corresponding alarming device, a second alarm reminder based on the second alarm instruction.

Optionally, the method further includes: setting at least one wireless communicator for each group of storage compartments; transmitting, using one corresponding wireless communicator, the decoding information, the item location information, and the operation type information determined by the decoding module to the data managing module; and transmitting, using one corresponding wireless communicator, the second alarm instruction generated by the information obtaining unit to a corresponding alarming device.

Other aspects of the present disclosure can be understood by those skilled in the art in light of the description, the claims, and the drawings of the present disclosure.

BRIEF DESCRIPTION OF THE DRAWINGS

Various objectives, features, and advantages of the present disclosure can be more fully appreciated with reference to the detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Reference input now be made in detail to exemplary embodiments of the invention, which are illustrated in the accompanying drawings in order to fully understand and being able to implementing the present disclosure and to realizing the technical effect. It should be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

In accordance with various embodiments, the present disclosure provides a system for item management and a method for item management.

Figure 1:
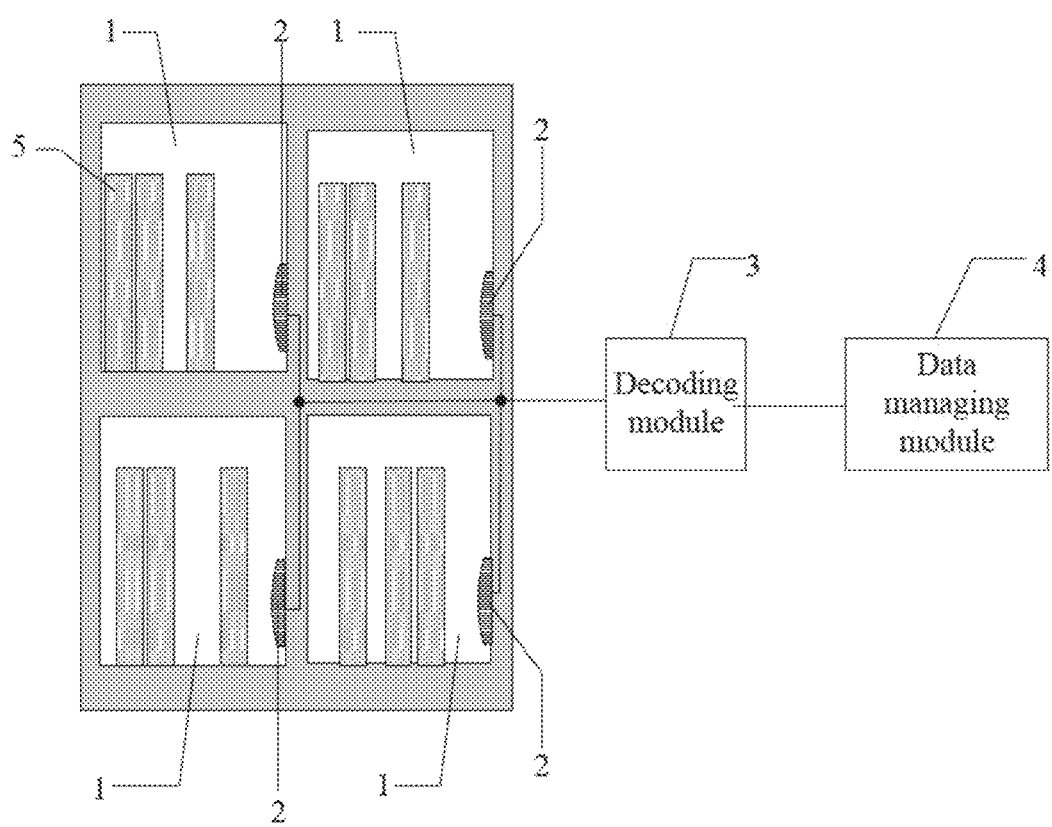
FIG. 1 illustrates a schematic structural view of an exemplary item management system in accordance with some embodiments of the present disclosure.

Referring to FIG. 1, a schematic structural view of an exemplary item management system is shown in accordance with some embodiments of the present disclosure. As illustrated, the item management system can include a decoding module 3, a data managing module 4, and multiple scanners 2.

In some embodiments, one scanner 2 can be provided on each storage compartment 1 of the items. For example, a scanner 2 can be installed on each cargo box. As another example, a scanner 2 can be installed on each row of a storage rack.

Each scanner 2 can be used for scanning an identification code on each item 5 that is to be stored in or taken out from the corresponding storage compartment 1.

The decoding module 3 can be used for decoding an identification code on an item scanned by one scanner 2, generating decoding information corresponding to the identification code upon a successful decoding, determining an operation type of the item based on a scanning of the identification code on the item, and obtaining item location information based on an identification of the corresponding scanner that scanned the identification code on the item.

The data managing module 4 can be used for updating item management information according to the decoding information, the item location information, and the operation type corresponding to the identification code. The item management information can at least include decoding information, item location information, item quantity information, and item information of multiple items.

In the disclosed item management system, a scanner is provided in each storage compartment. The scanners can scan the identification codes on the items when the items are stored in or taken out from corresponding storage compartments. As such, the decoding module can generate decoding information corresponding to the identification codes, and determine operation type information and item location in information. Based on the decoding information, operation type information and item location information, the data management module can update the item management information. By using the equipment instead of using labor to implement series of complex and cumbersome operations, the item management can be desirably fast and accurate.

In some embodiments, determining the operation type of the item based on a scanning of the identification code on the item can include the following. When the identification code is scanned in a first direction, the operation type of the item can be determined as a placing-down operation, when the identification code is scanned in a second direction, the operation type of the item can be determined as a picking-up operation.

When the identification code is scanned in a first direction, an inner side of the identification code on the item that is close to an inner side of the storage compartment can be scanned before an outer side of the identification code on the item that is close to an outer side of the storage compartment is scanned.

When the identification code is scanned in a second direction, an outer side of the identification code on the item that is close to an outer side of the storage compartment can be scanned before an inner side of the identification code on the item that is close to an inner side of the storage compartment is scanned.

In the above-described embodiments of the disclosed item management system, the items should be stored in or taken out from the storage compartment in a regulated manner. In order to determine an operation type of an item based on a scanning of the identification code on the item, the item should be placed in the storage compartment in accordance with a certain regular in reference of the identification code on the item.

For example, when placing an item, the identification code on the item should be facing to the scanner, so that when the item is stored in or taken out from the storage compartment, the scanner in the storage compartment can scan the identification code. In addition, all the items can be placed on a same direction that the identification code side can face the scanner in the storage compartment, so that the directions of scanning the identification codes can be easily identified at the time of storing or taking the items.

Figure 2:
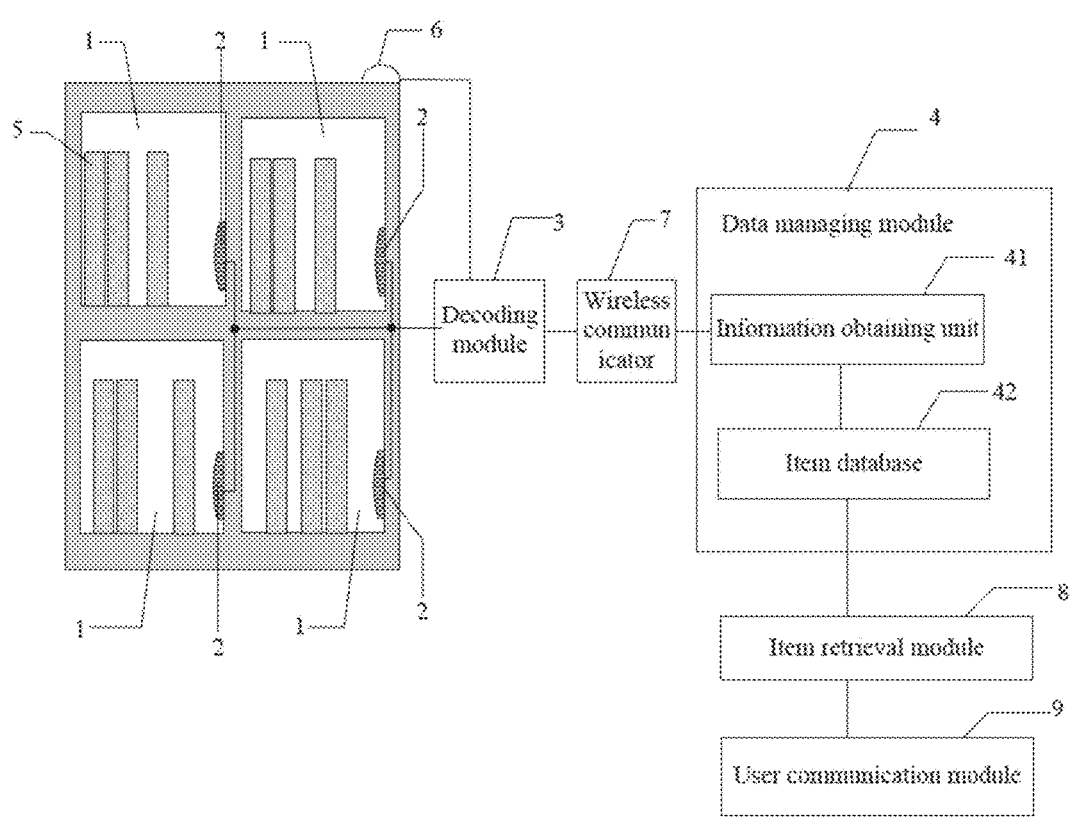
FIG. 2 illustrates a schematic structural view of another exemplary item management system in accordance with some other embodiments of the present disclosure.

Referring to FIG. 2, a schematic structural view of another exemplary item management system is shown in accordance with some other embodiments of the present disclosure.

As illustrated, the data managing module 4 can specifically include an information obtaining unit 41 and an item database 42.

The information obtaining unit 41 can be use for obtaining item information from an identification code database pre-established based on decoding information and according to item location information.

The item database 42 can be used for updating item management information based on the obtained item information, and decoding information, item location information, and operation type information corresponding to the item information.

In some specific implementations, the item management information can be updated based on the obtained item information, and decoding information, item location information, and operation type information corresponding to the item information.

For example, when an operation type of an item is determined to be a placing-down operation, if the item database does not include any record of such item or such type of item, the item management information including the decoding information, the item location information, the item quantity information, and the item information of the item can be added into the item database. If the item database has a record of such item or such type of item, a quantity of such item at the corresponding location in the item management information can be increased by one. As another example, when an operation type of an item is determined to be a picking-up operation, a quantity of such item at the corresponding location in the item management information can be decreased by one.

In some implementations, in a disclosed specific item management system, when the identification code is designed only for the specific system, the pre-established identification code database corresponding to the decoding information can be independently established for the specific system. If the identification code adopts domestic or international passed code, the pre-established identification code database corresponding to the decoding information can generally exist. In such situations, the pre-establishment of the identification code database corresponding to the decoding information for the system can be omitted.

In some embodiments, the disclosed item management system can further include an alarming device 6 for each group of storage compartments. The groups of storage compartments can be defined as a natural set of storage compartments. Taking a library as an example, a storage compartment can be identified as a row of a bookshelf, and a group of storage compartments can be identified as a bookshelf. Taking a warehouse as another example, a storage compartment can be identified as a storage rack, and a group of storage compartments can be identified as a storage room having multiple storage racks.

The decoding module 3 can be further used for generating a first alarm instruction when a decoding operation fails.

The alarming device 6 can be used for performing a first alarm reminder based on the first alarm instruction.

In some embodiments, in the item management system, the information obtaining unit 41 can be further used for generating a second alarm instruction when it is failed to obtain item information based on the decoding information.

The alarming device 6 can be further used for performing a second alarm reminder in accordance with the second alarm instruction.

As such, a real-time monitoring can be realized by using the alarming device 6 to find the reason for the failure of decoding or failure of obtaining item information.

In some specific implementations, in the item management system, the alarming device 6 can use a suitable signal to perform the first alarm reminder and the second alarm reminder. For example, different light signals, sound signals, or combinations can be used for performing the first alarm reminder and the second alarm reminder.

In some embodiments of the disclosed item management system, the decoding module 3 can be generally disposed at a position close to the scanner 2. The data managing module 4 can be generally implemented by software, so that the carrier of the data managing module 4 can generally be a computer or the like. When there are a large number of groups of storage compartments, the data managing module 4 and some groups of storage compartments may be relatively far away from each other. Therefore in some embodiments, as illustrated in FIG. 2, the item management system can further include a wireless communicator 7 for each group of storage compartments.

The wireless communicator 7 can be used for transmitting the decoding information, the item location information, and the operation type information determined by the decoding module 3 to the data managing module 4, and for transmitting the second alarm instruction generated by the information obtaining unit 41 to the alarming device 6.

In some specific implementations, the wireless communicator 7 can generally include a first wireless communication unit connected to the decoding module and a second wireless communication unit connected to the data management module. As such, the decoding module 3 can firstly transmit the determined the decoded information, item location information, and operation type information the first wireless communication unit. Then the first wireless communication unit can wirelessly transmit the received data to the second wireless communication unit. Finally, the second wireless communication unit can transmit the received data to the data managing module 4.

Similarly, the second alarm instruction generated by the information obtaining unit 41 can be firstly transmitted to the second wireless communication unit. Then the second wireless communication unit can wirelessly transmit the received second alarm instruction to the first wireless communication unit. Finally, the first wireless communication unit can transmit the received second alarm instruction to the alarming device 6.

In some specific implementations, in the disclosed item management system, the identification code can be any suitable graphic code that can identify an item, such as a two-dimensional code, a bar code, a number code, a character code, etc.

In some specific implementations, in the disclosed item management system, the items can be books. The identification code of a book can be a barcode on the back of the book. The decoding information generated by the barcode can be the international standard book number (ISBN).

In some specific implementations, in the disclosed item management system, when the items are books, the identification code database corresponding to the decoded information can be an ISBN database. Since each ISBN is an international number designed specifically for recognizing a book or a publication document, the ISBN database is a public shared database, there is no need to independently establish an identification code database. Therefore, the information obtaining unit 41 can query the ISBN database to obtain the item information according to the decoding information. In this case, it is also possible to obtain the item information by querying on the Internet.

In some specific implementations the disclosed item management system can further include an item retrieval module used for searching the data management module based on a searching query and outputting the searching result. As such, the item management information in the item management system can be obtained by using the cargo retrieval module through a terminal device such as a computer, a mobile phone, etc.

In some embodiments, as shown in FIG. 2, the disclosed item management system can further include an item retrieval module 8 and a user communication module 9.

The item retrieving module 8 can be used for receiving a searching query through the user communication module 9, performing a searching operation in the data management module 4 based on the received searching query, and outputting a searching result through the user communication module 9.

As such, a user can send a searching query to the user communication module through a terminal device such as a computer or a mobile phone, and can obtain a searching result such as the name, position, quantity, description, and any other information about an item corresponding to the searching query through the user communication module 9.

It should be noted that, the decoding module 3, the data managing module 4, the wireless communicator 7, the item retrieval module 8, and the user communicator module 9 can be realized by a general computing system, such as one or more servers, etc.

Figure 4:
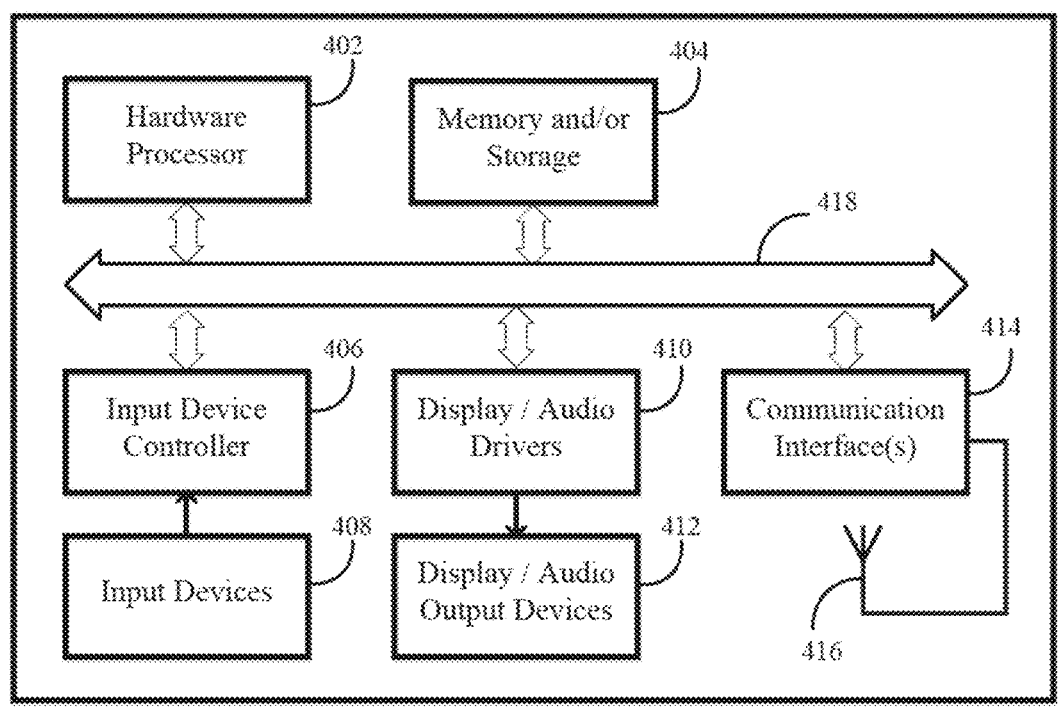
FIG. 4 illustrates a schematic hardware structural diagram of an exemplary item management system in accordance with some embodiments of the present disclosure.

Referring to FIG. 4, a schematic hardware structural diagram of an exemplary item management system is shown in accordance with some embodiments of the present disclosure.

The hardware of the item management system can include at least one hardware processor 402, memory and/or storage 404, an input device controller 406, multiple input devices 408, display/audio drivers 410, display and audio output devices 412, communication interface(s) 414, at least one antenna 416, and a bus 418.

Hardware processor 402 can include any suitable hardware processor, such as a microprocessor, a micro-controller, a central processing unit (CPU), a network processor (NP), a digital signal processor (DSP), an application specific integrated circuit (ASIC), a field-programmable gate array (FPGA), or other programmable logic device, discrete gate or transistor logic device, discrete hardware components. The hardware processor 802 can implement or execute embodiments of the disclosed subject matter including one or more method, steps and logic diagrams. A general purpose processor may be a microprocessor or any other conventional processors.

Memory and/or storage 404 can be any suitable memory and/or storage for storing programs, data, item managing information, and/or any other suitable content in some embodiments. For example, memory and/or storage 404 can include random access memory (RAM), read only memory, flash memory, non-volatile memory, such as hard disk storage, optical media, and/or any other suitable storage device.

Input device controller 406 can be any suitable circuitry for controlling and receiving input from the multiple input devices 408 in some embodiments. For example, the multiple input devices 408 can include the multiple sensors 2 shown in FIG. 2, a touch screen, a keyboard, a mouse, a microphone, a camera, etc. The input device controller 406 can be circuitry for receiving inputs from the multiple sensors 2, the touch screen, from one or more buttons, from a voice recognition circuit, from the microphone, from the camera, from an optical sensor, from an accelerometer, from a temperature sensor, from a near field sensor, and/or any other suitable circuitry for receiving user input.

Display/audio drivers 410 can be any suitable circuitry for controlling and driving output to one or more display and audio output devices 412 in some embodiments. For example, display/audio drivers 410 can be circuitry for driving an LCD display, a speaker, an LED, multiple alarming devices 6 shown in FIG. 2, and/or any other display/audio devices.

Communication interface(s) 414 can be any suitable circuitry for interfacing with one or more communication networks, such as a communication network in some embodiments. For example, interface(s) 414 can include network interface card circuitry, wireless communication circuitry, and/or any other suitable circuitry for interfacing with one or more communication networks, such as Internet, wide area network, local network, metropolitan area networks, etc.

Antenna 416 can be any suitable one or more antennas for wirelessly communicating with a communication network in some embodiments. In some embodiments, antenna 416 can be the wireless communicator 7 shown in FIG. 2.

In some embodiments, the communication network can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

Bus 418 can be any suitable mechanism for communicating between two or more of components of the webpage resource acquisition apparatus. Bus 418 may be an ISA bus, a PCI bus, an EISA bus, or any other suitable bus. The bus 418 can be divided into an address bus, a data bus, a control bus, etc. The bus 418 is represented as a two-way arrow in FIG. 4, but it does not mean that it is only one type bus or only one bus.

The functions of the decoding module 3, the data managing module 4, the item retrieval module 8, and the user communicator module 9 can be directly executed by a hardware decoding processor, or by a decoding processor combined by a hardware module and a software module. The software modules may reside in any suitable storage/memory medium, such as a random access memory, a flash memory, a read-only memory, a programmable read-only memory, an electrically erasable programmable memory, a register, etc. The storage medium can be located in the memory and/or storage 404. Similarly, the hardware processor 402 can implement the steps of the method described below in connection with FIG. 3 by combining the hardware and the information read from the memory and/or storage 404.

Figure 3:
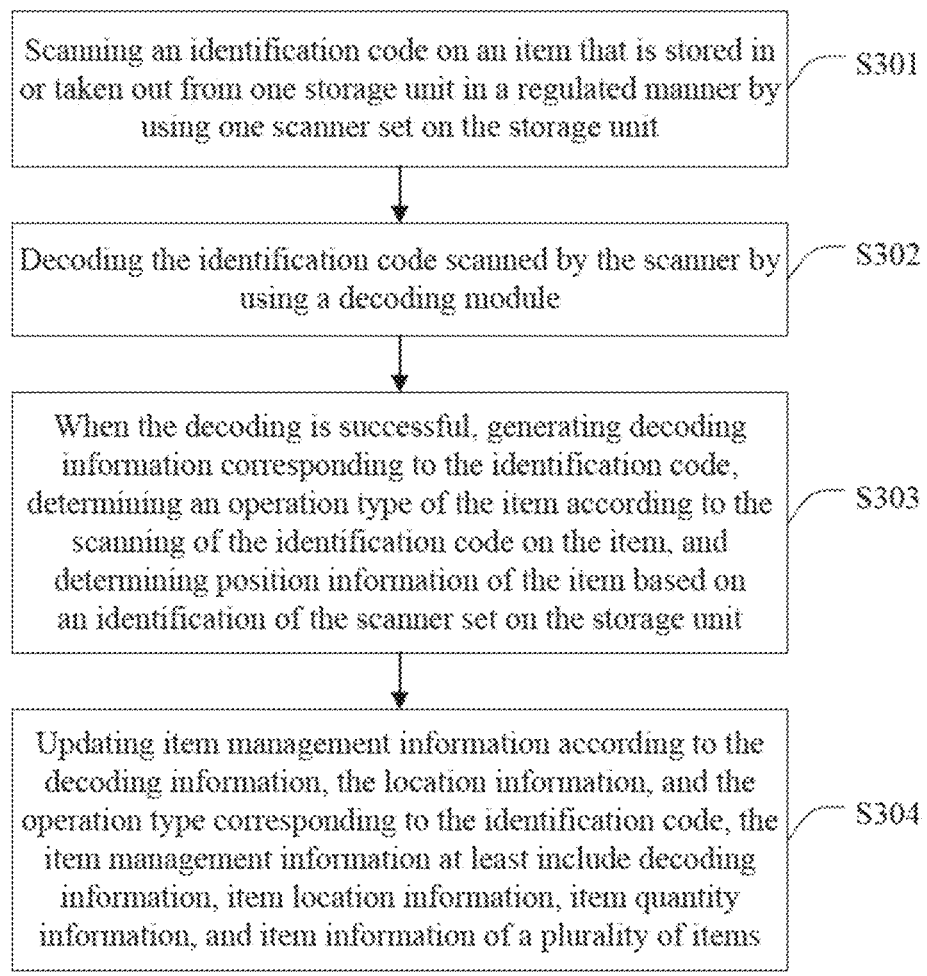
FIG. 3 illustrates a schematic flow diagram of an exemplary item management method in accordance with some embodiments of the present disclosure.

Referring to FIG. 3, a schematic flow diagram of an exemplary item management method is shown in accordance with some embodiments of the present disclosure. As illustrated, the item management method can include the following steps.

At step S301, an identification code on an item that is stored in or taken out from a storage compartment in a regulated manner can be scanned by using a scanner set on the storage compartment.

At step S302, the identification code scanned by the scanner can be decoded by using a decoding module.

At step S303, if the decoding is successful, the decoding information corresponding to the identification code can be generated, an operation type of the item can be determined according to the scanning of the identification code on the item, and the item location information of the item can be determined based on an identification of the corresponding scanner set on the storage compartment.

At step S304, item management information can be updated according to the decoding information, the item location information, and the operation type corresponding to the identification code. The item management information can at least include decoding information, item location information, item quantity information, and item information of multiple items.

In some embodiments, a process for determining the operation type of the item based on a scanning of the identification code on the item can include the following. When the identification code is scanned in a first direction, the operation type of the item can be determined as a placing-down operation, when the identification code is scanned in a second direction, the operation type of the item can be determined as a picking-up operation.

When the identification code is scanned in a first direction, an inner side of the identification code on the item that is close to an inner side of the storage compartment can be scanned before an outer side of the identification code on the item that is close to an outer side of the storage compartment is scanned.

When the identification code is scanned in a second direction, an outer side of the identification code on the item that is close to an outer side of the storage compartment can be scanned before an inner side of the identification code on the item that is close to an inner side of the storage compartment is scanned.

In some embodiments, a process for updating the item management information according to the decoding information, the item location information, and the operation type corresponding to the identification code can include the following procedures.

Firstly, item information can be obtained from an identification code database pre-established based on decoding information and according to item location information.

Then, item management information can be updated based on the obtained item information, and decoding information, item location information, and operation type information corresponding to the item information.

In some embodiments, in the disclosed item management method, an alarming device can disposed for each group of storage compartments. The groups of storage compartments can be defined as a natural set of storage compartments. Taking a library as an example, a storage compartment can be identified as a row of a bookshelf, and a group of storage compartments can be identified as a bookshelf. Taking a warehouse as another example, a storage compartment can be identified as a storage rack, and a group of storage compartments can be identified as a storage room having multiple storage racks.

After decoding the identification code scanned by the scanner, the method can further include generating a first alarm instruction when a decoding operation fails, and performing a first alarm reminder by using the alarming device based on the first alarm instruction.

In some embodiments, the method can further including generating a second alarm instruction when it is failed to obtain item information based on the decoding information, and performing a second alarm reminder by using the alarming device in accordance with the second alarm instruction.

In the disclosed item management method, a scanner can be provided in each storage compartment. The scanners can scan the identification codes on the items when the items are stored in or taken out from corresponding storage compartments. As such, the decoding module can generate decoding information corresponding to the identification codes, and determine operation type information and item location information. Based on the decoding information, operation type information and item location information, the data management module can update the item management information. By using the equipment instead of using labor to implement series of complex and cumbersome operations, the item management can be desirably fast and accurate.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a system for item management and a method for item management are provided.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A system for item management, comprising:
a plurality of storage compartments;
at least one scanner on each storage compartment, wherein each scanner is configured to scan an identification code on an item that is picked up from the storage compartment and placed down in the storage compartment;
a memory; and
at least one processor, wherein:
the at least one processor is coupled to the at least one scanner and the memory; and
the memory stores computer-executable instructions for controlling the at least one processor to:
decode an identification code on an item scanned by one scanner;
generate decoding information for the identification code upon a successful decoding;
determine an operation type of the item based on the scanning of the identification code on the item;
obtain item location information for the identification code, based on the one scanner for the identification code; and
update item management information according to the decoding information, the item location information, and the operation type of the item for the identification code,
wherein the item management information further includes item quantity information, and item information; and
the operation type of the item includes a placing-down operation and a picking-up operation;
wherein the at least one processor is further configured to:
determine the operation type of the item as the placing-down operation in response to scanning the identification code in a first direction; and
determine the operation type of the item as the picking-up operation in response to scanning the identification code in a second direction;
wherein:
an inner side of the identification code on the item close to an inner side of the storage compartment is scanned before an outer side of the identification code on the item close to an outer side of the storage compartment is scanned, as the identification code is scanned in the first direction; and
an outer side of the identification code on the item close to an outer side of the storage compartment is scanned before an inner side of the identification code on the item close to an inner side of the storage compartment is scanned, as the identification code is scanned in a second direction.

2. The system of claim 1, further comprising:
a user communication module; and
an item retrieving module configured to receive a searching query through the user communication module, perform a searching operation in the data management module based on the received searching query, and output a searching result through the user communication module.

3. A system for item management, comprising:
a plurality of storage compartments;
at least one scanner on each storage compartment, wherein each scanner is configured to scan an identification code on an item that is picked up from the storage compartment and placed down in the storage compartment;
at least one alarming device for each group of storage compartments;
a memory; and
at least one processor, wherein:
the at least one processor is coupled to the at least one scanner and the memory; and
the memory stores computer-executable instructions for controlling the at least one processor to:
decode an identification code on an item scanned by one scanner;
generate decoding information for the identification code upon a successful decoding;
determine an operation type of the item based on the scanning of the identification code on the item;
obtain item location information for the identification code, based on the one scanner for the identification code; and
update item management information according to the decoding information, the item location information, and the operation type of the item for the identification code,
wherein the item management information further includes item quantity information, and item information;
wherein the at least one processor is further configured to:
obtain item information from an identification code database pre-established based on decoding information and according to item location information; and
update item management information based on the obtained item information, as well as decoding information, item location information, and operation type information in line with the item information;
wherein the at least one processor is further configured to generate a first alarm instruction in a case that a decoding operation fails; and
wherein each alarming device is configured for performing a first alarm reminder based on the first alarm instruction;
wherein:
the at least one processor is further configured to generate a second alarm instruction in a case that it is failed to obtain item information based on the decoding information; and
each alarming device is configured to perform a second alarm reminder based on the second alarm instruction.

4. The system of claim 3, further comprising:
at least one wireless communicator for each group of storage compartments;
wherein each wireless communicator is configured to transmit the decoding information, the item location information, and the operation type information determined by the decoding module to the data managing module, and to transmit the second alarm instruction generated by the information obtaining unit to a corresponding alarming device.

5. The system of claim 3, further comprising:
a user communication module; and
an item retrieving module configured to receive a searching query through the user communication module, to perform a searching operation in the data management module based on the received searching query, and to output a searching result through the user communication module.

6. A method for item management, comprising:
setting at least one scanner for each of a plurality of storage compartments;
scanning an identification code on an item that is picked up from one storage compartment or placed down in one storage compartment in a regulated manner by using a scanner setting on the one storage compartment;
decoding the identification code scanned by the scanner by using a decoding module;
when the decoding is successful, generating decoding information for the identification code, determining an operation type of the item according to the scanning of the identification code on the item, and determining item location information based on an identification of the scanner set on the storage compartment; and
updating item management information according to the decoding information, the item location information, and the operation type for the identification code,
wherein the item management information further includes item quantity information, and item information;
wherein determining the operation type of the item based on the scanning of the identification code on the item includes:
determining the operation type of the item as a placing-down operation in response to scanning the identification code in a first direction; and
determining the operation type of the item as a picking-up operation in response to scanning the identification code in a second direction;
wherein:
scanning the identification code in the first direction indicates that an inner side of the identification code on the item close to an inner side of the storage compartment is scanned before an outer side of the identification code on the item close to an outer side of the storage compartment is scanned; and
scanning the identification code in a second direction indicates that an outer side of the identification code on the item close to an outer side of the storage compartment can be scanned before an inner side of the identification code on the item close to an inner side of the storage compartment is scanned.

7. The method of claim 6, further comprising:
establishing an identification code database based on decoding information and according to item location information;
obtaining item information of the item from the identification code database based on decoding information for the identification code of the item; and
updating an item database based on the obtained item information.

8. The method of claim 7, wherein updating the item database based on the obtained item information includes:
- when the operation type of the item is determined as a placing-down operation, and the item database does not include any record of the item, the item management information including the decoding information, the item location information, the item quantity information, and the item information of the item into the item database;
- when the operation type of the item is determined as a placing-down operation, and the item database has a record of the item, increasing a quantity of the item at a corresponding location in the item management information by one; and
- when the operation type of the item is determined as a picking-up operation, decreasing a quantity of the item at a corresponding location in the item management information by one.

9. The method of claim 8, further comprising:
- setting at least one alarming device for each group of storage compartments;
- generating a first alarm instruction when a decoding operation fails;
- performing, using one corresponding alarming device, a first alarm reminder based on the first alarm instruction;
- generating a second alarm instruction when it is failed to obtain item information based on the decoding information; and
- performing, using one corresponding alarming device, a second alarm reminder based on the second alarm instruction.

10. The method of claim 9, further comprising:
- setting at least one wireless communicator for each group of storage compartments;
- transmitting, using one corresponding wireless communicator, the decoding information, the item location information, and the operation type information determined by the decoding module to the data managing module; and
- transmitting, using one corresponding wireless communicator, the second alarm instruction generated by the information obtaining unit to a corresponding alarming device.

* * * * *